No. 647,382. Patented Apr. 10, 1900.
M. H. DONAHUE.
DEVICE FOR STOPPING LEAKS IN HOSE COUPLINGS.
(Application filed Feb. 15, 1900.)
(No Model.)
Fig. I.
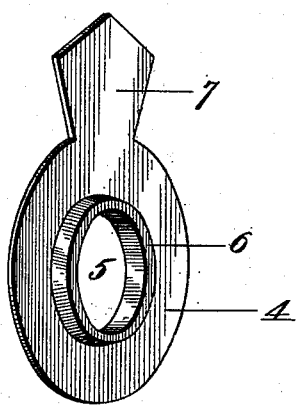
Fig. II.
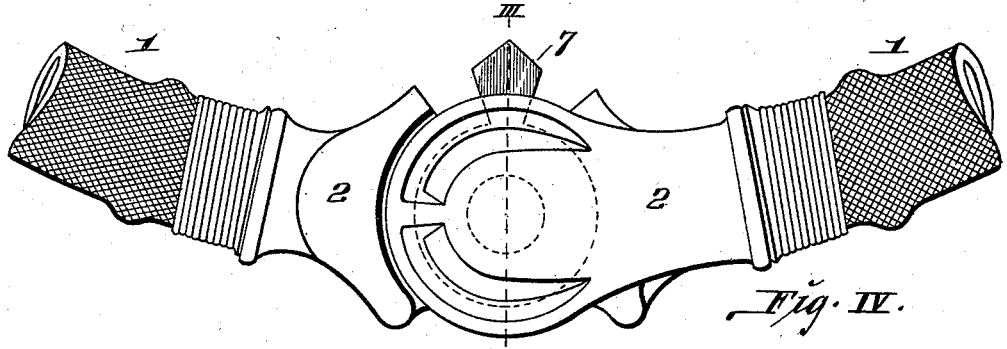
Fig. III.
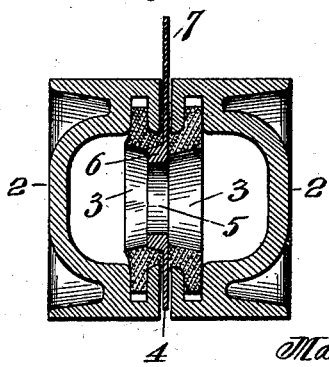
Fig. IV.
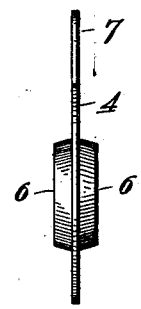
Inventor:
Martin H. Donahue
By Wright &c.
Att'y's
Attest:
M. F. Smith
E. S. Knight
THE NORRIS PETERS CO., PHOTO-LITHO., WASHINGTON, D. C.

UNITED STATES PATENT OFFICE.

MARTIN H. DONAHUE, OF SIOUX CITY, IOWA, ASSIGNOR OF ONE-HALF TO WARWICK HOUGH, OF ST. LOUIS, MISSOURI.

DEVICE FOR STOPPING LEAKS IN HOSE-COUPLINGS.

SPECIFICATION forming part of Letters Patent No. 647,382, dated April 10, 1900.

Application filed February 15, 1900. Serial No. 5,243. (No model.)

*To all whom it may concern:*

Be it known that I, MARTIN H. DONAHUE, a citizen of the United States, residing at Sioux City, in the county of Woodbury, Iowa, have invented certain new and useful Improvements in Devices for Stopping Leaks in Hose-Couplings, of which the following is a full, clear, and exact description, reference being had to the accompanying drawings, forming part of this specification.

My invention is more particularly intended for stopping leaks temporarily in the couplings of air-brake hose, although it is capable of such use in hose used for other purposes where the couplings are provided with gaskets which, coming together, are intended to form a tight joint to prevent leaking of fluid at the couplings. As is well known, these gaskets become by use worn and pressed out of shape, so that they do not properly perform their function and at times are the source of constant annoyance and delay in running trains, owing to the fact that the train-pipe does not hold its air. With the use of my device the coupling can be temporarily made perfectly tight, and the device is provided with a signal-finger that indicates to the proper person when the train reaches its destination that the coupling requires repair by the insertion of a new gasket or gaskets.

My invention consists in features of novelty hereinafter fully described, and pointed out in the claims.

Figure I is a perspective view of my improved device. Fig. II is a side view or elevation showing the device in use. Fig. III is a section taken on line III III, Fig. II. Fig. IV is an edge view showing a modification.

Referring to the drawings, 1 represents the adjacent ends of a pair of hose for connecting together the train-pipes of two cars.

2 represents the couplings, which are of any ordinary construction, having the usual gaskets 3, the outer faces of which contact when in use to form a tight joint. As stated, these gaskets become worn and pressed out of shape by use, so that they do not effectually perform their function, and the coupling thus becomes leaky, and when this occurs the train-pipe does not hold its air and the brake system is rendered ineffectual, sometimes causing much delay in running the train while the engineer attempts to repair the coupling to prevent the leak. With the use of my device the coupling can be quickly repaired and rendered perfectly tight until the train reaches a point where a new gasket can be supplied.

The device consists of a disk 4, having a central opening 5, around which there is a conical flange or shoulder 6, the base of which is of about the size (preferably a little larger) than the opening in the gasket. If a leak occurs, the coupling is disconnected and the disk is inserted with the flange 6 entering the disabled gasket. The coupling is then again connected, when it will be found to be perfectly tight. If both gaskets are out of order, it is apparent that two of the disks can be used placed back to back, or, if preferable, it is apparent that a single disk, with a flange or shoulder 6 on each side, as shown in Fig. IV, may be employed. By making the external diameter of the shoulder 6 slightly larger than the opening in the gasket the latter is spread outwardly and slightly elongated, so as to bring its outer surface snugly against the disk, as shown in Fig. III, and if after being used for a time the disk is removed the gasket will be found to act satisfactory for a time, in connection with its mate, in effecting a tight joint.

The disk 4 is provided with a projection or finger 7, that indicates to the proper person when the train reaches its destination that the coupling is out of repair and should be supplied with a fresh gasket or gaskets.

It is intended that the device be carried on trains, especially freight-trains, where they are letting out and picking up cars continually and the gaskets of which are liable to be out of good condition. The device can be readily carried by brakemen in their pockets, so that a coupling can be made tight without any perceptible loss of time.

Heretofore it has been customary in repairing leaks to take a torch and thaw out a frozen gasket, and in so doing the life of the rubber is destroyed and the gasket rendered useless. By my invention this is obviated. In short, the device does away with all delays pertaining to leaky gaskets, and the couplings are made perfectly air-tight.

I claim as my invention—

1. In a device of the character described, a disk having an opening and provided with a flange for entering the gasket of the coupling, substantially as set forth.

2. In a device of the character described, consisting of a disk having an opening, and a conical-shaped flange for entering the gasket of a coupling, substantially as described.

3. A device of the character described, consisting of a disk having an opening, and a flange for entering the gasket of the coupling; said disk having a projection that extends beyond the coupling, for the purpose set forth.

MARTIN H. DONAHUE.

In presence of—
T. ROOPE,
D. RICHARDSON.